United States Patent
Corless

[15] 3,675,705
[45] *July 11, 1972

[54] TIRE BEAD SEATING AND INFLATION APPARATUS

[72] Inventor: Lee M. Corless, Grosse Pointe Woods, Mich.

[73] Assignee: B & J Manufacturing Company, Glenwood, Ill.

[*] Notice: The portion of the term of this patent subsequent to Jan. 5, 1988, has been disclaimed.

[22] Filed: Nov. 16, 1970

[21] Appl. No.: 89,952

[52] U.S. Cl. ............................................................... 157/1.1
[51] Int. Cl. ........................................................... B60c 25/12
[58] Field of Search ................................................... 157/1.1

[56] References Cited

UNITED STATES PATENTS 3,461,938  8/1969  Mueller ................................. 157/1.1
3,552,469  1/1971  Corless ................................. 157/1.1

FOREIGN PATENTS OR APPLICATIONS 814,172  6/1959  Great Britain ........................ 157/1.1

Primary Examiner—Granville Y. Custer, Jr.
Attorney—Whittemore, Hulbert & Belknap

[57] ABSTRACT

Apparatus for seating the beads and inflating tubeless tires on a vehicle wheel is provided. The apparatus for seating the tire beads comprises an annular tube having orifice means for injection of air under pressure peripherally around the tire through the space between the wheel rim and the tire bead. The inflation apparatus comprises means for connecting air under pressure to the conventional tire valve. Means are provided to control the simultaneous injection of air into the tire from the bead seating apparatus and through the conventional tire valve. In one embodiment, the apparatus is integrated into a conventional tire mounting and de-mounting device.

13 Claims, 9 Drawing Figures

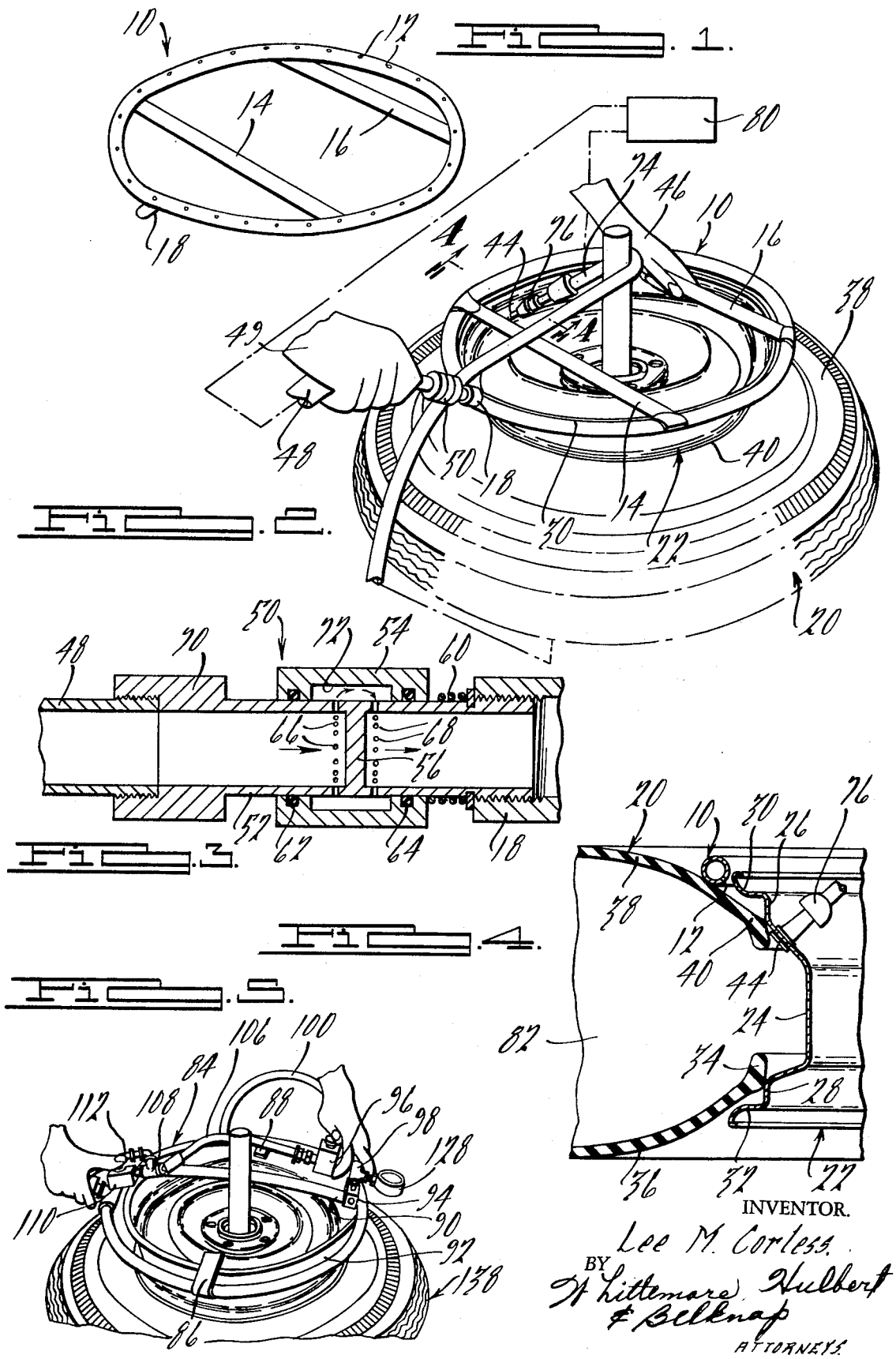

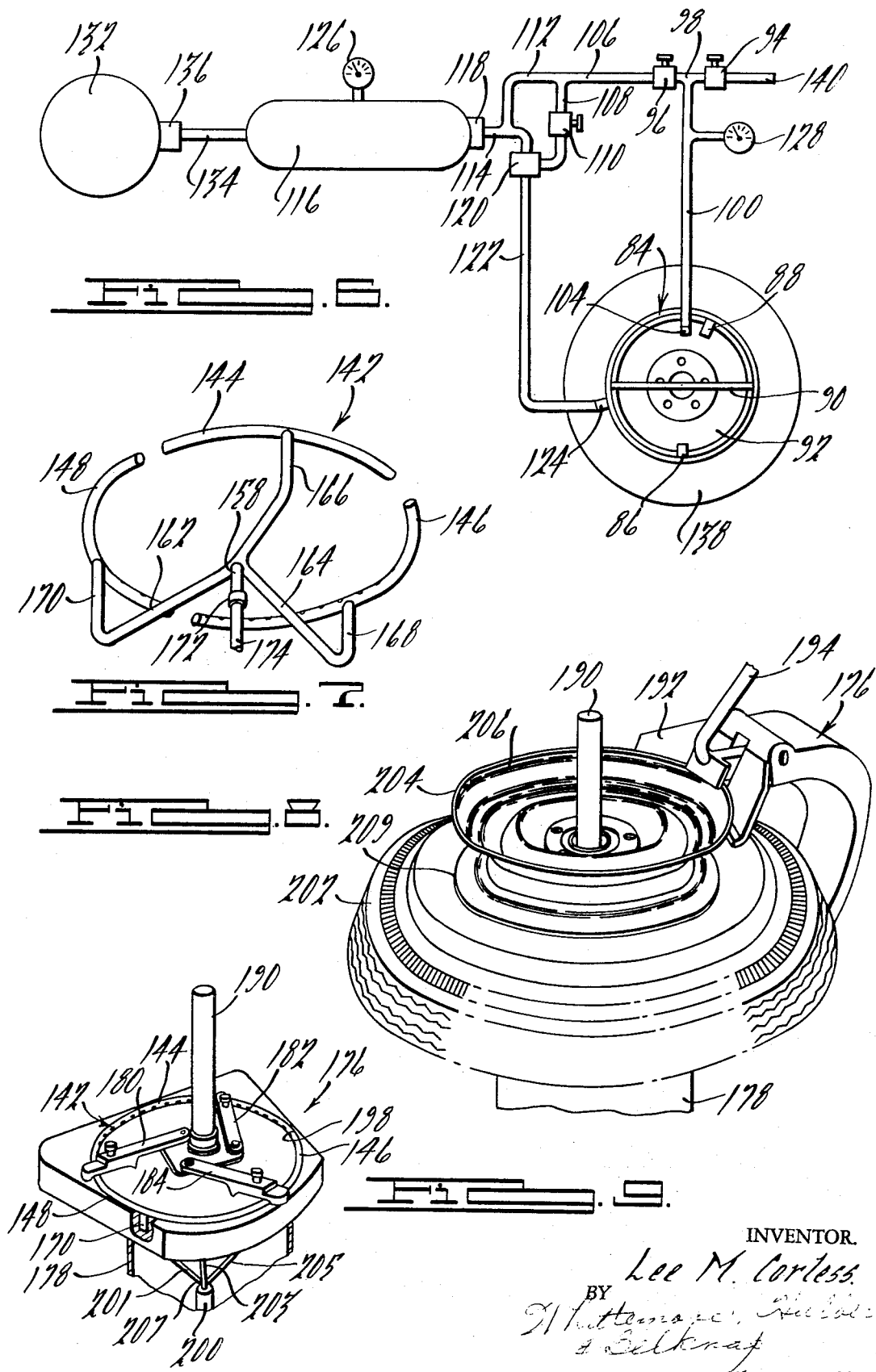

TIRE BEAD SEATING AND INFLATION APPARATUS

BACKGROUND OF THE INVENTION

Inflation of tubeless tires on vehicle wheels has proved to be a problem. When a tubeless tire is mounted on a wheel, the sidewalls do not normally form sealing engagement with the rim of the wheel. Various mechanical techniques have been utilized in the past to bulge the sidewalls of the tire out and cause engagement of the tire beads with the wheel rim whereupon the tire may be inflated through the conventional tire valve. Such techniques have proved to be awkward and time consuming and have not been readily adaptable to some types of tires, such as radial ply and glass belted tires.

In my co-pending U.S. Pat. application Ser. No. 800,679, filed Feb. 19, 1969 now U.S. Pat. No. 3,552,469, issued Jan. 5, 1971, I have disclosed apparatus for inflating tubeless tires which utilizes only a simple annular tubular member having orifices spaced around the periphery thereof through which air is injected into a tire through the gap between the tire bead and wheel rim. The device does not employ any working parts which must slide or otherwise fit exactly on the tire or wheel. There is no wear of the parts and the problem of accurate dimensions is considerably reduced. The apparatus therein disclosed has proved to be satisfactory for most types of tires. The present invention provides modified versions of the basic invention which aid in more efficiently manipulating the device during the inflation process and providing more sophisticated means of operation. Additionally, in one structure, the device is incorporated into a conventional tire mounting apparatus to facilitate use of a single station for mounting, demounting and inflation.

SUMMARY OF THE INVENTION

Apparatus for inflating tubeless tires on a vehicle wheel having oppositely disposed rim portions is provided. The apparatus includes tire bead seating apparatus which includes an annular tube of larger diameter than the wheel to surround the rim of the wheel. Structure extends radially inwardly of the tube for abutment against the rim to position the apparatus with respect to the wheel. Orifice means are provided around the periphery of the tube for injecting a substantially continuous ring of air under pressure through the space between the wheel rim and the bead of a non-inflated tubeless tire mounted on the wheel. Inlet means are provided on the tube for supplying air under pressure to the interior of the tube. In one embodiment, the annular tube is segmented to provide gaps therearound for reception over obstructing structure which may be present in tire mounting apparatus in connection with which the device is used. In the drawings:

FIG. 1 is a view in perspective of one embodiment of the tire bead seater in accordance with the present invention;

FIG. 2 is a view in perspective of the tire bead seater of FIG. 1 and associated tire inflating apparatus illustratively being utilized to inflate a tire;

FIG. 3 is a longitudinal sectional view of the sleeve valve utilized with the tire bead seater in FIG. 2;

FIG. 4 is a sectional view taken substantially along the line 4—4 of FIG. 2 looking in the direction of the arrows;

FIG. 5 is a perspective view of a modified version of the tire bead seater and associated pneumatic tire inflation apparatus illustratively positioned to inflate a tire;

FIG. 6 is a circuit diagram of the pneumatic system of FIG. 5;

FIG. 7 is a perspective view of a modified version of the tire bead seater;

FIG. 8 is a perspective view of a portion of a tire mounting machine with the tire bead seater of FIG. 7 incorporated thereinto; and FIG. 9 is a perspective view of the machine of FIG. 8 with parts broken away to expose the tire bead seater.

Referring to FIG. 1, the tire bead seater 10 comprises an annular tubular member having a diameter somewhat larger than both the outer diameter of a vehicle wheel and the inner diameter of a vehicle tire. A single bead seater 10 may service tires having some variation in inner diameter. Bead seaters having larger or smaller diameters than that shown may be provided for inflation of various sized tires. It has been found in practice that four sizes will accommodate the great majority of passenger car tires and truck tires. The bead seater 10 may be fabricated from various materials such as metal, plastic or rubber. The bead seater 10 may be a cast element or it may be formed by bending a length of tubing into a circle and sealing the free ends to each other.

A plurality of orifices 12 are provided in spaced apart relationship around the interior periphery of the bead seater 10. The orifices may be provided at, for example two inch intervals, although other spacings are permissible depending upon the application, size of orifices, size of ring and the like. Instead of a circular opening as shown, a continuous or interrupted slit may be used to form the orifice means. Nozzles also may be utilized as orifice means.

A pair of spaced apart tubular members 14, 16 extend across the bead seater 10 and are secured thereto at the outer ends thereof as by welding or brazing. The members 14, 16 are positioned on the outer surface of the bead seater 10 to permit the bead seater to extend slightly over the rim of a wheel. The members 14, 16 function to prevent insertion of the bead seater entirely over the wheel. It has been found that the bead seater may be positioned a substantial distance from the adjacent sidewall of the tire and it will still cause the beads of the tire to seat. Placing the bead seater directly on the sidewall of the tire is somewhat disadvantageous in that the angle of the inflating air with respect to the geometry of the wheel and tire is not as efficient. The members 14, 16 additionally provide convenient hand holds to hold the bead seater down in a desired fixed position during the seating process. They also structurally rigidify the device.

An injection nozzle 18 is provided for injecting air from a source of air under pressure into the bead seater so that air will be expelled therefrom through the orifices 12 as individual air jets. The nozzle 18 is preferably a ¾-inch nozzle for the reception of a 1-inch air hose for supplying a sufficient volume of air for inflating a truck tire, while for a passenger tire a ½-inch nozzle and ¾-inch hose is satisfactory. The nozzle 18 may be larger or smaller depending upon the type of tire which is to be inflated.

In accordance with the method of the invention, the tire bead seater 10 is utilized as illustrated in FIGS. 2 and 4. A tubeless tire 20 is first mounted on a wheel 22 as shown in FIG. 2. This is accomplished by means of a conventional tire mounting apparatus. It will be noted that the wheel 22 comprises a central cylindrical well 24, outwardly extending annular flange portions 26, 28 which terminate in annular flange-like rims 30, 32. The flanges 26, 28 serve as the sealing surfaces for the tire beads and also, in conjunction with the rims, as positioning and retaining structure for the tire.

It will be noted that the lower bead 34 of the tire sidewall 36 rests on the radially inward portion of the lower flange 28 thus partially seating the bead. The upper sidewall 38, as is the usual condition when attempting to inflate tubeless tires, is collapsed downwardly with the bead 40 out of engagement with the upper wheel flange 26 and rim 30. There is therefore a relatively wide space between the bead 40 and rim 30. It is consequently impossible to inflate the tire by means of the usual tire valve 44 because air which is injected through the valve 44 will escape to the atmosphere via the space between wheel rim and tire bead without inflating the tire.

After the tire 20 has been mounted on the wheel 22, the tire bead seater 10 is placed over the wheel 22. It will be noted that the orifices 12 extend beyond the wheel rim and are aimed at the space between the wheel rim and tire bead. When air pressure is applied to the interior of the bead seater, discrete jets of air will be injected entirely around the periphery of the wheel and tire. These jets of air tend to merge as they expand and form a substantially continuous cone-like curtain of high pressure air. As will be noted, the tubular members 14, 16 engage the outer edge of the rim 30 to position the apparatus with respect to the wheel. The space between the bead seater and adjacent sidewall of the tire may be quite large as illustrated and the bead seater will still be effective to cause seating of the tire beads.

It will be noted that the bead seater is maintained in place during seating of the tire beads by the operator grasping one of the tubular members 16 with one hand 46 and the air hose structure which is attached to the nozzle 18 with his other hand 19. This prevents the bead seater from rising as the result of back air pressure during seating of the tire beads.

The air hose 48, which is a flexible member, is attached to the nozzle 18 by means of a sleeve valve 50. The sleeve valve 50 is a desired type of valving because it permits direct manual control at the location of the nozzle 18 without resort to a pilot valve and remotely placed pilot operated main valve. Conventional push button valves are not of sufficient capacity to permit direct turning off and on at the location of the nozzle 18. If a push button valve of sufficient capacity were used, it would be too heavy and bulky to be mounted on the bead seater 10.

The structure of the valve 50 is illustrated in FIG. 3. As will be noted, the valve includes a tubular body 52. The nozzle 18 is secured to one end of the body 52 and air hose 48 is secured to the other end. A sleeve 54 is slidably mounted on the body 52. A wall member 56 is provided centrally within the body 52. An O-ring 62, 64 is provided at each end of the sleeve 54. A plurality of peripherally spaced openings 66 are provided adjacent one side of the wall 56. A second set of openings 68 are provided on the other side of the wall 56. A spring 60 biases the sleeve 54 to the left into abutment with enlarged head 70. In this position, the O-ring 64 is located between openings 66, 68 and blocks passage of air through openings 66 and the valve is closed. When the sleeve is shifted to the right as illustrated, the O-rings 62, 64 are positioned on either side of the openings 66, 68. The sleeve has an annular interior slot 72 which provides a passageway between the openings 66, 68 allowing air as indicated by the arrows to pass around the wall 56 through the valve 50 and into the bead seater 10 causing partial inflation of the tire 20. Upon release of the sleeve, the valve will automatically close.

A second air hose 74 is secured to the conventional valve 44 by means of a releasable chuck element 76. The chuck 76 is of a conventional type and is manually engageable with the valve stem. The chuck contains an interior core which mates with the tire valve core causing opening of the chuck and tire valve for the passage of air. After the tire has been inflated the chuck is removed in the reverse manner.

The air lines 48, 74 lead to an air tank 80 which provides a relatively large volume of air under the desired pressure, as for example, in the range of from 160 to 175 pounds per square inch. Thus, a surge of air under pressure is available to cause inflation of the tire. The air tank 80 may be filled by the usual air compressor available in tire mounting service stations. Frequently, the line losses from the usual air compressor available at these stations are sufficient to prevent bead seating of a tire when the air supply lines are connected directly without provision of an intermediate surge tank 80 located near the bead seater.

When the valve 50 is opened, air under pressure is injected into the tire interior chamber 82 via the orifices 12. The sidewall 38 begins to rise as a result of the increased air pressure within the chamber 82. While some high pressure air may escape to the atmosphere, there is sufficient air under pressure forced into the chamber 82 to cause partial inflation of the tire. A wall or curtain of air under pressure, as previously mentioned, forms across the space between tire bead and wheel rim preventing or minimizing passage of air under pressure from the tire 20. Thus, the sidewall 38 will rise until a point of equilibrium, as shown in FIG. 4, is reached, wherein the bead 40 contacts the wheel periphery but does not necessarily have sealing engagement therewith. At this time, any space between the tire bead and wheel rim is relatively small and forms a fluid restriction. The valve 44, which is open, is constantly permitting air under pressure to be injected into the tire chamber 82. This causes complete inflation of the tire after initial bead seating with the tire beads sealingly engaging the wheel in the usual manner. The amount of air under pressure injected into the tire may be checked in the usual manner by means of a manual air gauge and the exact desired tire inflation pressure secuted by the conventional hunt and seek technique.

FIGS. 5 and 6 illustrate another embodiment of the bead seater in which a more sophisticated control mechanism is provided for tire inflation.

The tire bead seater 84 is in most respects similar to the tire bead seater 10 previously described. The principal difference resides in the provision of generally oppositely disposed tabs 86, 88 and a crossbar 90 which are provided in place of the pair of tubular members 14, 16 to position the bead seater on a wheel 92 in the desired fashion. A vent valve 94 and inflation valve 96 are fixedly mounted on the bead seater. The vent valve 94 is secured to the bar 90. A rigid fitting 98 extends between the valves 94, 96. If desired, the valves 94, 96 may be integrated into a single unit with a single control. A flexible air hose 100 extends from a point between valves 94, 96 and terminates in a chuck which is the same in construction as the chuck 76. This chuck, when manually attached to the tire inflation valve 104, will also result in both the chuck and the tire valve opening. A flexible tube 106 extends from the valve 96 into connection with a T-fitting 108. A pilot valve 110 is connected to the T-fitting 108. A flexible air line 112 extends from the fitting 108 into connection with a rigid outlet tube 114 which extends from air reservoir tank 116. A manually operable on-off valve 118 is provided at the outlet from the tank 116. A pilot operated main valve 120 is carried by the outlet 114 downstream from the connection with the air line 112. A flexible air hose 122 of relatively large diameter, for example three-quarters of an inch, is secured to the outlet of the valve 120. The other end of the air hose 122 is secured to the inlet nozzle 124 of the bead seater.

The air tank 116 is provided with an air gauge 126 which is utilized to determine tank pressure which is, for example, in the range of 175 pounds per square inch when the tank is fully charged. A similar air gauge 128 is provided on the fitting 98 which connects the valves 94, 96 to the air hose 100. Tank 116 is provided with compressed air by means of a compressor 132 which is connected thereto by air line 134. An on-off valve 136 is provided at the outlet of the compressor.

In operation of the structure, the bead seater 84 is placed on the rim of the wheel 92 after a tire 138 has been mounted thereon. The pilot valve 110 is then opened causing the valve 120 to also open and inject air under pressure into the bead seater 84 whereupon the tire sidewalls will substantially seat as previously described. The valve 96 may be opened substantially simultaneously with opening of the valve 110. As soon as the tire beads have been substantially seated, the plunger on the valve 110 is released resulting in the valve being spring biased to the closed position. The closing of the valve 110 functions to cause closing of the valve 120 with the result that the supply of high pressure air to the bead seater is discontinued. Venting means are preferably provided in connection with either the pilot valve 110 or main valve 120 to cause immediate venting of the connection therebetween upon closing of the pilot valve 110 so that the valve 120 will close substantially simultaneously with the closing of the valve 110.

Air is injected via the valve 96 until the operator believes there is enough air pressure in the tire 138. To check this, he releases the valve button resulting in the valve 96 being automatically closed by internal spring means. The operator then may read the interior tire pressure on the gauge 128. If the tire pressure is too low, he then again opens valve 96. If, by checking of the gauge 128, it is noted that the tire pressure is too high, the valve 94 is opened. The valve 94 has a vent line 140 to atmosphere. Opening of the valve 94 will function to relieve pressure in the tire 138. The proper desired pressure in the tire 138 is thus obtained by manipulation of the valves 94, 96.

FIGS. 7, 8 and 9 illustrate another embodiment of the invention. As will be noted in FIG. 7, the bead seater 142 is not formed as a continuous ring but is formed of three arcuate segments 144, 146, 148. The ends of each of these segments are plugged so that air cannot escape via the ends. Each segment is provided with a plurality of spaced apart orifices. The orifices are arranged as previously described for the injection of discrete jets of air outwardly from the bead seater. The spaces between the segments are so dimensioned as to avoid the presence of a significant gap in the ejected air ring. Preferably, an orifice is provided at each end of each segment. The air jets which emanate from the orifices tend to spread as they move away from the bead seater. This spreading results in linking up of the air between the segments with the result that the final curtain of air is functionally continuous, that is, any gaps which may exist do not effect operability.

The distance between the segments may be varied somewhat. Generally speaking, such distance may be approximately equal to the distance between any adjacent pair of orifices. However, it is not necessary that this exact dimension be held as it is possible to increase or decrease the distance somewhat depending upon the particular design of the bead seater. Additionally, the orifices adjacent the ends of the segments may be aimed to direct a stream of air into the space between the segments. In this respect, as previously noted, an orifice is preferably provided immediately adjacent each end of each segment to the end that there will be a jet of air at this location.

Illustratively, the bead seater 142 is formed of three segments thus resulting in three gaps or spaces between the segments. More or fewer segments may be used as desired. The basic function of providing the gaps is to permit passage of the bead seater over obstructions which may be present on conventional tire mounting apparatus. The bead seater may be designed, for example, to swing horizontally over the center post provided on conventional tire mounting apparatus. The provision of three spaces in the present case is particularly adapted for use in connection with tire mounting illustrated in FIGS. 8 and 9.

The bead seater 142 is structurally held together and supplied with air by means of a web-like structure which includes a center air supply tube 158 having three radially outwardly extending tubes 160, 162, 164 on the inner end thereof. Each of the tubes 160, 162, 164 is joined to the center of a segment 144, 146, 148 by means of a short length of tube 166, 168, 170. All of the tubing thus described is of a rigid nature so as to provide strength. The tubes may be joined together as by welding or brazing.

It will be noted that the length of the tubes 166, 168, 170 permits insertion of the bead seater substantially beyond the rim of a wheel contrary to the structure described in the previous embodiments wherein the bead seater is positioned almost directly adjacent the rim of the wheel. Either system may be used to advantage depending upon the particular application to which the bead seater is directed. The center tubular member 158 is provided with a nozzle 172 to which a flexible hose 174 is secured. The hose 174 is connected at the other end to a source of air under pressure.

FIGS. 8 and 9 illustrate the bead seater 142 incorporated into a conventional tire mounting apparatus. The apparatus 176 includes a base 178 which rests on a floor surface. Three peripherally spaced clamps 180, 182, 184 are provided on the upper surface of the base. The clamps are movable radially inwardly and outwardly by manipulation of a handle (not shown). The function of the clamps is to engage the lower rim portion of a wheel and hold the wheel in position during mounting and de-mounting of a tire therefrom. An upstanding power driven center post 190 is provided for driving an arm (not shown) used for forcing a tire bead over the wheel rim. The usual shoe structure 192, manipulatable by means of handle 194, is provided for bead breaking.

The bead seater 142 is mounted on the base 178 with the orifices aimed upwardly. The bead seater is received in a discontinuous recess 198 with the tubular structure thereof located within the base. As will be noted, the spaces between the segments 144, 146, 148 fit around the clamp elements 180, 182, 184. During mounting and de-mounting of a tire on the wheel, the bead seater 142 is retracted downwardly so as to be out of the way. After the tire has been mounted and the clamps 180, 182, 184 and shoe structure 192 have been retracted, the bead seater 142, which is connected to a double-acting pneumatic cylinder 200, is extended upwardly over the rim of the wheel by actuation of the cylinder 200. Cylinder 200 has three rods 201, 203, 205 which extend from piston rod 207 into connection with the tubes 160, 162, 164. The tire 202 rests on the bead seater thus causing seating of the upper bead 209 of the tire against the upper rim 204 of the wheel 206. When air under pressure is supplied to the bead seater, the tire 202 will begin to inflate as previously described. As the tire inflates, it will rise until the lower tire bead has seated against the lower wheel rim. Air is then injected through the usual tire valve as previously described in order to completely inflate the tire. After the tire has been inflated, it is removed from the apparatus whereupon the cylinder 200 is actuated to retract the bead seater 142 and ready the apparatus for operation on another wheel and tire assembly.

What I claim as my invention is:

1. Apparatus for inflating tubeless tires on a vehicle wheel having oppositely disposed rim portions comprising tire bead seating apparatus including an annular tube of larger diameter than the wheel to surround a rim of the wheel, structure extending radially inwardly of said tube for abutment against said rim to position the apparatus with respect to the wheel, orifice means around the inner periphery of the tube for injecting a substantially continuous ring of air under pressure through the space between the wheel rim and the bead of a non-inflated tubeless tire mounted on the wheel, and inlet means on the tube for supplying air under pressure to the interior of the tube; said tire bead seating apparatus having no mechanical sealing element capable of sealing a gap between the wheel and the tire.

2. Apparatus as defined in claim 1, further characterized in that said structure extending radially inwardly of said tube includes a hand engageable member extending across a portion of the apparatus.

3. Apparatus as defined in claim 2, further characterized in that at least two of said hand engageable members extend across the apparatus, said members being spaced apart and generally parallel.

4. Apparatus as defined in claim 2, further characterized in the provision of a radially inwardly extending tab on the apparatus on each side of said hand engageable member.

5. Apparatus as defined in claim 1, further characterized in that said inlet means on the tube comprises a nozzle on the tube, a valve on said nozzle, and an air line secured to said valve, said valve including manually operable means for opening and closing thereof.

6. Apparatus as defined in claim 5, further characterized in that said valve is a sleeve-type valve including a body and a sleeve slidably mounted thereon, said sleeve being manually movable in one direction to open the valve and manually movable in the opposite direction to close the valve.

7. Apparatus as defined in claim 6, further characterized in the provision of spring means on the valve biasing the sleeve towards the closed position.

8. Apparatus as defined in claim 1, further characterized in the provision of a source of air under pressure, a normally closed pilot operated main valve between said inlet means and the source of air under pressure, a pilot valve, said pilot valve being connected between said pilot operated main valve and said source of air under pressure and being effective upon being opened to cause opening of said pilot operated main valve to permit passage of air under pressure into the bead seating apparatus, said pilot operated main valve including means to automatically close upon the closing of said pilot valve.

9. Apparatus as defined in claim 1, further characterized in that said vehicle wheel includes a conventional tire valve, and a manually releasable chuck attachable to said conventional tire valve for supplying air under pressure to the interior of the tire in addition to the air under pressure supplied by the tire bead seating apparatus.

10. Apparatus as defined in claim 9, further characterized in the provision of a pair of valves, one of said valves being connected between said chuck and a supply of air under pressure for injecting air under pressure through the conventional tire valve, the other of said valves being connected between said chuck and atmosphere for venting air from a tire to the atmosphere, and an air pressure gauge on said chuck indicating the air pressure in the tire when both of said valves are closed.

11. Apparatus as defined in claim 1, further characterized in that said annular tube comprises a plurality of segments, the ends of each segment being sealed, said inlet means on the tube including separate inlets to each of the segments for supplying air under pressure to the interior of each segment, the ends of each segment being separated by a gap of insufficient length to prevent the creation of a substantially continuous ring of air under pressure to the space between the wheel rim and the bead of a non-inflated tubeless tire mounted on the wheel when air under pressure is injected into the apparatus.

12. The method of inflating a non-inflated tubeless tire on a vehicle wheel comprising the steps of applying an annular orifice structure to one side of a tire and wheel assembly, positioning the orifice structure with respect to the wheel by abutment of structure extending radially inwardly from said orifice structure against the wheel, injecting air under pressure from said orifice structure into the tire peripherally around the wheel through the space between the wheel rim and the tire bead in sufficient amounts, without using a mechanical seal, so that more air is injected into the tire than may escape with the result that the tire will be expanded to cause the tire beads to sufficiently close on the wheel rims to permit complete inflation through the conventional tire valve, and then completely inflating the tire by injecting air under pressure through the conventional tire valve.

13. Apparatus for inflating tubeless tires on a vehicle wheel having oppositely disposed rim portions comprising tire bead seating apparatus including an annular orifice structure having orifice means provided around a periphery of larger diameter than the diameter of a wheel to surround the rim of a wheel for injecting air under pressure around the periphery of the wheel through the space between the wheel rim and the bead of a non-inflated tubeless tire mounted on the wheel in sufficient amounts, without using a mechanical seal, so that more air will be injected into the tire than may escape with the result that the tire will be expanded to cause the tire beads to sufficiently close on the wheel rims to permit complete inflation through the conventional tire valve, structure extending radially inwardly of said annular orifice structure for abutment against said wheel to position the apparatus with respect to the wheel, and inlet means on said orifice structure for supplying air under pressure to the orifice means.

* * * * *